United States Patent [19]

Jung

[11] Patent Number: 5,714,811
[45] Date of Patent: Feb. 3, 1998

[54] ROTOR POSITION DETECTING APPARATUS FOR A BRUSHLESS MOTOR

[75] Inventor: Yeong Chun Jung, Seoul, Rep. of Korea

[73] Assignee: Samsung Electronics Co., Ltd., Suwon, Rep. of Korea

[21] Appl. No.: 325,299

[22] PCT Filed: May 4, 1993

[86] PCT No.: PCT/KR93/00036

§ 371 Date: Dec. 28, 1994

§ 102(e) Date: Dec. 28, 1994

[87] PCT Pub. No.: WO93/22820

PCT Pub. Date: Nov. 11, 1993

[30] Foreign Application Priority Data

May 6, 1992 [KR] Rep. of Korea ............ 1992-7640

[51] Int. Cl.⁶ ............ H02K 29/10; G01D 5/26; G02B 6/24
[52] U.S. Cl. ............ 310/68 B; 310/66; 310/71; 385/53; 250/231.13; 417/902
[58] Field of Search ............ 310/68 R, 66, 310/71, 68 B; 385/40, 101, 88, 89, 55, 56; 250/227.24, 231.1, 231.13, 231.14, 231.18; 439/577; 417/902

[56] References Cited

U.S. PATENT DOCUMENTS

| | | | |
|---|---|---|---|
| 3,567,327 | 3/1971 | Gerard | 250/231.1 |
| 3,961,184 | 6/1976 | Schurrer | 250/231.1 |
| 4,096,383 | 6/1978 | Mancini et al. | 250/231.1 |
| 4,162,399 | 7/1979 | Hudson | 250/231.1 |
| 4,430,566 | 2/1984 | Searle | 250/231.1 |
| 4,472,664 | 9/1984 | Chung | 318/138 |
| 4,491,793 | 1/1985 | Germer et al. | 250/239 |
| 4,536,649 | 8/1985 | Kozai et al. | 250/231.1 |
| 4,639,076 | 1/1987 | Mikolaicyk et al. | 350/96.2 |
| 4,689,483 | 8/1987 | Weinberger | 250/231.1 |
| 4,797,549 | 1/1989 | Ho et al. | 250/231.1 |
| 4,844,582 | 7/1989 | Giannini | 439/577 |
| 5,015,056 | 5/1991 | Yamaguchi et al. | 250/227.11 |
| 5,047,629 | 9/1991 | Geist | 250/231.13 |
| 5,248,881 | 9/1993 | Kaminaga et al. | 250/227.21 |

FOREIGN PATENT DOCUMENTS

| | | | |
|---|---|---|---|
| 0 285 053 | 10/1988 | European Pat. Off. | G01D 5/34 |
| 25 51 527 | 5/1976 | Germany | G08C 1/700 |
| 2221031 | 1/1990 | United Kingdom | 310/68 B |

Primary Examiner—Thomas M. Dougherty
Assistant Examiner—B. Mullins
Attorney, Agent, or Firm—Burns, Doane, Swecker & Mathis, L.L.P.

[57] ABSTRACT

A compressor is driven by a brushless electric motor which includes a stator and rotor mounted in a closed housing. An optical fiber device detects the rotational position of the rotor by transmitting light into the housing from an outside light source and directing that light toward a surface of the rotor which has light reflecting and non-reflecting sections. The optical fiber device transmits reflected light out of the housing and to a photoelectric converting element. The optical fiber device comprises an internal optical fiber segment disposed within the housing, and an external optical fiber segment disposed outside of the housing. Light is transmitted between the internal and external segments by positioning respective ends of those segments in mutually facing relationship on opposite sides of a transparent window member disposed in the housing.

6 Claims, 3 Drawing Sheets

ROTOR POSITION DETECTING APPARATUS FOR A BRUSHLESS MOTOR

TECHNICAL FIELD

The present invention is related to a rotor position detecting apparatus for a brushless motor, and particularly to a rotor position detecting apparatus for a compressor which is embodied by a brushless motor.

BACKGROUND ART

In a refrigerator, an air conditioner or similar appliance, a compressor, which is used for changing the state of a fluid, for example refrigerant, is generally embodied by an A.C. induction motor. Furthermore, the compressor used in the appliance is tightly closed within a housing defined by parts welded together in order to prevent a decrease in the pressure therein. Within the housing, the motor is connected to a piston (in a reciprocating compressor). A connector, which is mounted in the body of the housing, has several terminals electrically connected to each of the phase windings of the motor. When the phase voltages are applied to the terminals, the axle of the motor starts to rotate, thereby causing the piston connected to the axle to reciprocate within a cylinder. In the manner described above, refrigerant is drawn into the cylinder and is then compressed. The closed compressor is required to normally operate under the temperature condition of a maximum 130° C. and several tens of Psi, and to endure oil and refrigerant.

Compared with an A.C. motor, a brushless motor has a low noise level and low power consumption, and may be operated at a continuously varying rotating rate. Considering the advantages, a closed compressor embodied by a brushless motor has been continuously developed. The brushless motor is activated by D.C. currents, out of phase from each other, flowing into each of the phase windings. Accordingly, a means for detecting the polarity of the rotor is essential to the brushless motor. A pair of light emitting and receiving elements are typically used for detecting the polarity of the rotor.

However, there is a problem in that it is impossible to place the light receiving and emitting elements in the housing of the closed compressor, which operates under high temperature and high pressure, because the elements are normally made of semiconducting material. Furthermore, there is another problem in that the compressor seal is easily damaged because the signal wires of the elements extend through the housing. Considering these problems, there has been developed a system using a winding induced voltage, instead of detecting by the elements. However, the system has a problem in that a means for detecting the winding induced voltage, a filter means and a means for starting the compressor are additionally required, and also it is not applicable to the brushless motor.

DISCLOSURE OF INVENTION

It is an object of the present invention to provide a rotor position detecting apparatus required for driving a brushless motor.

It is another object of the present invention to provide a rotor position detecting apparatus using a photoelectric conversion system to increase the detection ability in a brushless motor.

It is another object of the present invention to provide a rotor position detecting apparatus constructed with a simple configuration without damaging the seal of the closed compressor embodied by a brushless motor.

According to the present invention, there is provided a rotor position detecting apparatus for a brushless motor enclosed in a housing. The apparatus comprises a plurality of light reflecting members located symmetrically around the axis of the rotor; a plurality of light non-reflecting members located symmetrically around the axis of the rotor alternating with the light reflecting members; a pair of optical fibers for transmitting and receiving light signals, one end of the pair of the optical fibers positioned to face the surface of the rotor; a pair of light emitting and photoelectric converting elements respectively positioned to face the other end of the pair of transmitting and receiving optical fibers; and, a connector mounted to the body of the housing, the connector comprising a plurality of terminals connected to the phase windings of the stator, a hole for guiding the pair of transmitting and receiving optical fibers, and a transparent window for separating the pair of transmitting and receiving optical fibers into two.

BRIEF DESCRIPTION OF THE DRAWINGS

The present invention will now be described in detail with reference to the accompanying drawings: in which.

BEST MODE FOR CARRYING OUT THE INVENTION

As a preferred embodiment employing a rotor position detecting apparatus according to the present invention, a closed compressor will now be described in detail.

Figure 1:
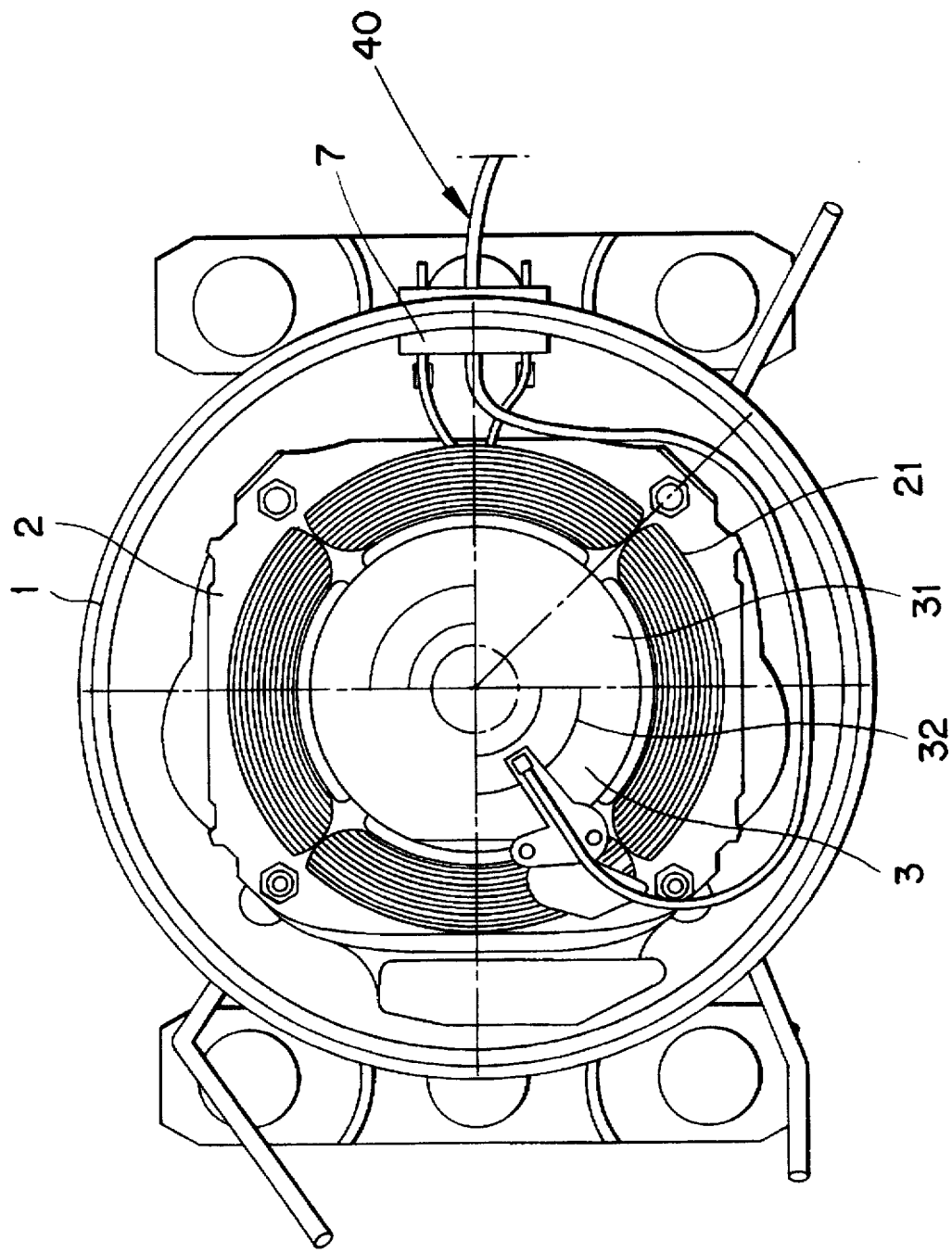
FIG. 1 is a plan view of a compressor, to which an apparatus of the present invention is applied, from which the upper cover thereof has been removed.
Figure 2:
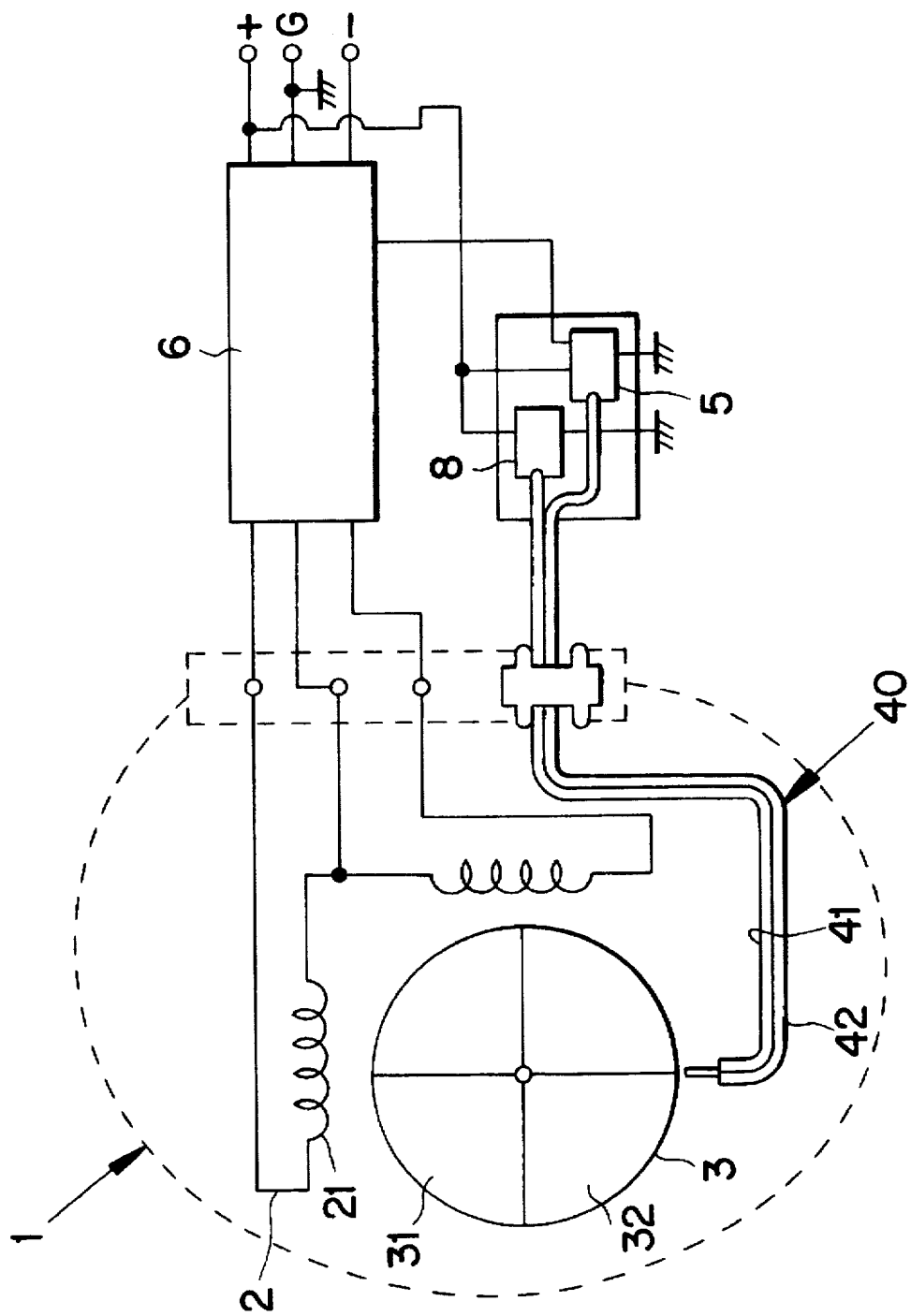
FIG. 2 is a circuit diagram for explaining a rotor position detecting apparatus according to the present invention.
Figure 3A:
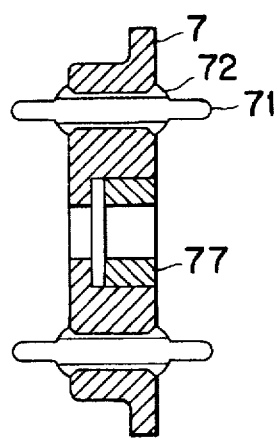
FIGS. 3A to 3C are cross-sectional views of a connector for a phase voltage supply and optical fibers according to the invention, in which 3A is a cross- sectional view of the connector, 3B is a cross-sectional exploded view of the connector, 3C is a cross-sectional view of a connector wherein the optical fibers are connected.
Figure 3B:
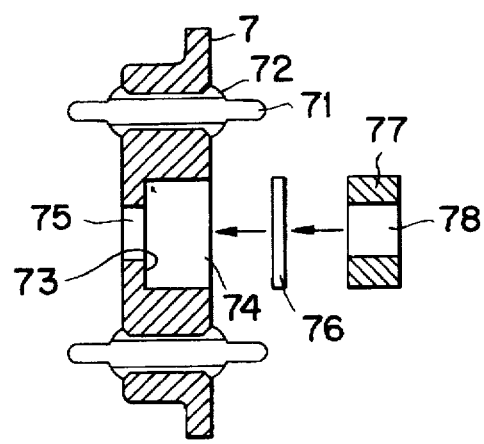
Figure 3C:
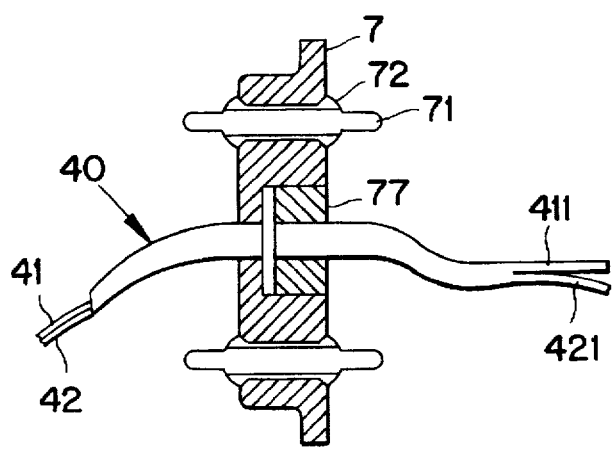
Figure 3D:
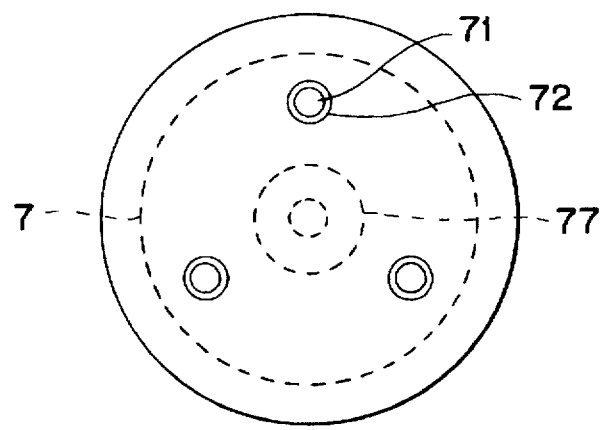
FIG 3D is a side view of the connector.

Referring to FIG. 1, the numeral 1 denotes a housing for tightly enclosing the compressor. Stator 2 with windings 21, is fixed to the housing 1, and a rotor 3 is rotatably mounted within the stator 2. In the preferred embodiment, the compressor is embodied by a bipolar two-phase brushless motor, but the number of poles and phase windings of the motor may be increased as appropriate. A control system for driving the brushless motor has already been disclosed in U.S. Pat. No. 4,472,664 by the inventor of the present invention. Therefore, a further thereof will be omitted in the specification. Two light reflecting members 31 are attached to the end surface of the rotor 3 in two 90° are quadrants opposite each other around the rotor axis. Two light non-reflecting members 32 are also attached to the end surface of the rotor 3 in alternating 90° arc quadrants with the light reflecting members 31. For example, the two light reflecting members 31 may be attached to the N-poles of the rotor 3, and the two light non-reflecting members 32 may be attached to the S-poles thereof. It is also possible to arrange the light reflecting and non-reflecting members 31 and 32 in other configurations. For example, the two light reflecting members 31 may be attached to the S-poles of the rotor 3, and the two light non-reflecting members 32 may be attached to the N-poles thereof. The number of the light reflecting and non-reflecting members 31 and 32 may be properly increased according to the number of poles and phase windings of the rotor 3. The light reflecting and non-reflecting members 31 and 32 may be also attached to the cylindrical surface of the rotor 3. An inner end of an optical fiber device 40 for transmitting and receiving light is positioned to face the light reflecting and non-reflecting members 31 and 32, as shown schematically in FIG. 2. The numeral 7 denotes a connector which has terminals 71 electrically connected to the phase windings 21 and the ground line. The external end of the optical fiber device 40 is positioned to face a pair of light emitting and photoelectric elements 8 and 5.

The optical fiber device 40 includes an internal segment comprised of an internal pair of optical fibers 41, 42 and an external segment comprised of an external pair of optical fibers 411, 421, wherein the internal optical fibers of the housing 1 to face the external optical fibers through the medium of a transparent window 76. Further details will be described later referring to FIGS. 3A to 3D.

Referring to FIGS. 3A to 3D, sealing members 72 are provided in the spaces between terminals 71 and connector 7 to prevent any decrease in pressure in the compressor. Guide holes 74 and 75 are formed in the middle portion of the connector 7. The diameter of hole 75 facing the interior of housing 1 is smaller than that of hole 74 facing the exterior of housing 1. Ends of the internal pair of optical fibers 41 and 42 are fitted into the hole 75. The transparent window 76 is inserted into the hole 74. A connecting member 77, which subsequently is tightly fitted into the hole 74, has a hole 78 for guiding ends of the external pair of optical fibers 411 and 421. The other ends of the pair of external optical fibers 411 and 421 are positioned to face the pair of light emitting and photoelectric elements 8 and 5. By arranging the apparatus in the manner described above, any decrease in the pressure in the compressor can be effectively prevented. That is, no optical fibers extend through the housing, which could prevent the housing from being properly sealed. Next, a motor drive control portion 6 is provided outside of the housing 1. The motor drive control portion 6 supplies the phase voltages to the terminals 71 connected with the phase windings 21.

In the apparatus described above, the light generated by the light emitting element 8 is transmitted by the optical fibers 41 and 411, and it reaches the end surface of the rotor 3, to which the light reflecting and non-reflecting members 31 and 32 are attached. The light thus supplied is reflected, and then transmitted through the optical fibers 42 and 421 only when the light reflecting members 31 pass across the ends of the optical fibers 41 and 42. The transmitted light is converted into a corresponding electric signal through the photoelectric converting element 5, and is provided to the motor drive control portion 6. Based on whether the electrical signal from the photoelectric converting element 5 is received or not, the motor drive control portion 6 detects the kind of pole of the rotor 3, thereby providing the phase windings 21 with voltages having different phases from each other.

The light emitting element 8 may be preferably embodied by a light emitting diode, the photoelectric converting element 5 may be preferably embodied by a photo transistor.

INDUSTRIAL APPLICABILITY

As described above, a rotor position detecting apparatus according to the present invention may be preferably applicable to a brushless motor, particularly to a closed compressor embodied by a brushless motor in a refrigerator or an air conditioner, thereby increasing not only the rotor position detecting ability but also the effectiveness of the seal of the closed compressor.

I claim:
1. An electric motor, comprising:

a closed housing containing a liquid;

a stator and a rotatable rotor disposed within said housing, said rotor including a reference section including a light reflecting surface and a light non-reflecting surface; and a rotor position detecting mechanism, including:
   a light emitting and receiving mechanism disposed outside of said housing and including a light emitting element and
   a photoelectric converting element,
   a hole formed in said housing,
   a transparent window extending across said hole and sealed against leakage of the liquid, and
   an optical fiber device for transmitting light from said light emitting element toward said reference section and for transmitting light reflected from said light reflecting surface to said photoelectric converting element, said optical fiber device comprising an internal segment disposed solely within said housing and an external segment disposed solely outside of said housing, a first end of said internal segment being directed toward said reference section, a first end of said external segment connected to said light emitting and receiving mechanism, and respective second ends of said internal and external segments being disposed on opposite sides of said transparent window in mutually facing relationship for transmitting light through said window, each of said internal and external segments comprising first and second optical fibers, said first fibers of said internal and external segments being aligned with one another on opposite sides of said window for transmitting emitted light to said reference section; said second fibers of said internal and external segments being aligned with one another on opposite sides of said window for transmitting light reflected from said reference section.

2. The electric motor according to claim 1, further including a connector mounted to said housing, said hole being formed in said connector, a plurality of terminals carried by said connector and connected to phase windings of said stator.

3. The electric motor according to claim 1, wherein said light reflecting and non-reflecting surfaces are disposed on an end face of said rotor.

4. The electric motor according to claim 2, wherein said light reflecting and non-reflecting surfaces are disposed on a cylindrical face of said rotor.

5. The electric motor according to claim 1, wherein said motor constitutes a brushless motor.

6. The electric motor according to claim 1, wherein the motor is a compressor and the liquid is a refrigerant pressurized by the compressor.

* * * * *